US008474855B2

(12) United States Patent
Kilen (10) Patent No.: US 8,474,855 B2
(45) Date of Patent: Jul. 2, 2013

(54) WHEELBARROW (76) Inventor: Scott R. Kilen, Hibbing, MN (US)

(*) Notice: Subject to any disclaimer, the term of this patent is extended or adjusted under 35 U.S.C. 154(b) by 112 days.

(21) Appl. No.: 13/100,590

(22) Filed: May 4, 2011

(65) Prior Publication Data

US 2011/0272924 A1 Nov. 10, 2011

Related U.S. Application Data (60) Provisional application No. 61/331,187, filed on May 4, 2010.

(51) Int. Cl.
B62B 1/24 (2006.01)

(52) U.S. Cl.
USPC ........ 280/653; 280/654; 280/655; 280/655.1; 280/47.31; 280/47.315

(58) Field of Classification Search
USPC .................. 280/653, 654, 655, 655.1, 47.31, 280/47.32, 47.315, 78; 298/2, 3
See application file for complete search history.

(56) References Cited

U.S. PATENT DOCUMENTS

| 1,485,179 | A | * | 2/1924 | Funk | 280/47.31 |
|---|---|---|---|---|---|
| 2,037,222 | A | * | 4/1936 | Farrar | 298/3 |
| 2,448,216 | A | * | 8/1948 | Gokey | 298/3 |
| 2,766,063 | A | * | 10/1956 | Greeley | 298/2 |
| 2,824,748 | A | * | 2/1958 | Schoenberger | 280/47.26 |
| 2,901,263 | A | * | 8/1959 | Loon, Jr. | 280/47.31 |
| 3,037,308 | A | * | 6/1962 | Miller | 37/403 |
| 3,092,418 | A | | 6/1963 | Themascus | |
| 4,479,658 | A | | 10/1984 | Michaux | |
| 5,690,191 | A | | 11/1997 | Burbank | |
| 6,125,512 | A | * | 10/2000 | Weber | 16/430 |
| 6,148,963 | A | | 11/2000 | Canfield, Jr. | |
| 7,032,718 | B1 | | 4/2006 | Lessard | |
| 7,396,207 | B2 | | 7/2008 | DeLong | |
| 2002/0113388 | A1 | * | 8/2002 | Robinson | 280/47.31 |
| 2005/0134012 | A1 | | 6/2005 | Kan | |
| 2005/0146102 | A1 | | 7/2005 | Zimmerman | |
| 2006/0033311 | A1 | * | 2/2006 | Lim | 280/653 |
| 2006/0250020 | A1 | | 11/2006 | Hill | |
| 2007/0007089 | A1 | * | 1/2007 | Silberman et al. | 188/2 D |
| 2010/0019472 | A1 | | 1/2010 | DiLorenzo, Sr. | |

FOREIGN PATENT DOCUMENTS

| EP | 1582431 | 10/2005 |
|---|---|---|
| GB | 1269153 | 4/1972 |
| GB | 2459083 | 10/2009 |

OTHER PUBLICATIONS

The International Search Report for International Application No. PCT/US2011/035172 mailed Aug. 18, 2011 (6 pages).
The Written Opinion for International Application No. PCT/US2011/035172 mailed Aug. 18, 2011 (8 pages).

* cited by examiner

Primary Examiner — J. Allen Shriver, II
Assistant Examiner — Steve Clemmons
(74) Attorney, Agent, or Firm — Dicke, Billig & Czaja, PLLC (57) ABSTRACT One aspect is wheelbarrow including a tub and a first frame portion coupled to, and providing support for, the tub. A wheel is supported below the first frame portion. A second frame portion is releasably coupled to the first frame portion and configured with a handle for gripping by a user. A trigger is adjacent the handle configured to release the first frame portion from the second frame portion when the trigger is actuated such that the tub is readily dumped.

16 Claims, 6 Drawing Sheets

Fig. 5 ated in and constitute a part of this specification. The
WHEELBARROW

CROSS REFERENCE TO RELATED APPLICATIONS

This Non-Provisional patent application claims the benefit of the filing dates of U.S. Provisional Patent Application Ser. No. 61/331,187, filed May 4, 2010, entitled "WHEELBARROW," which is herein incorporated by reference.

BACKGROUND

Wheelbarrows have been utilized for thousands of years. The basic design of the standard wheelbarrow has not changed in many years. Throughout history, difficulties in trying to dump and maneuver the standard wheelbarrows have been accepted. The current design solves these problems with use of a brake and a dump locking mechanism. The brake not only holds the wheel stationary during wheelbarrow dumping, but also can assist with movement on inclined surfaces. The new design will attract consumers who are interested in an ergonomically friendly wheelbarrow that will ease the amount of work.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
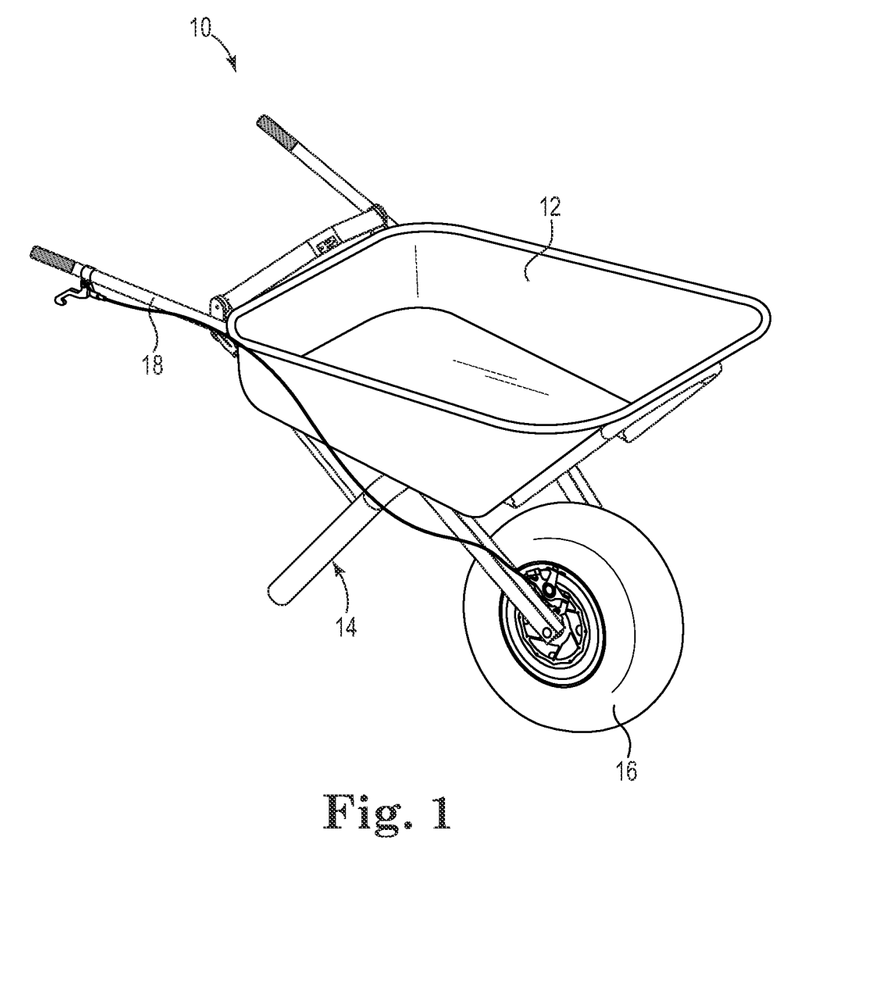
FIG. 1 is a perspective view illustrating a wheelbarrow in accordance with one embodiment.
Figure 2:
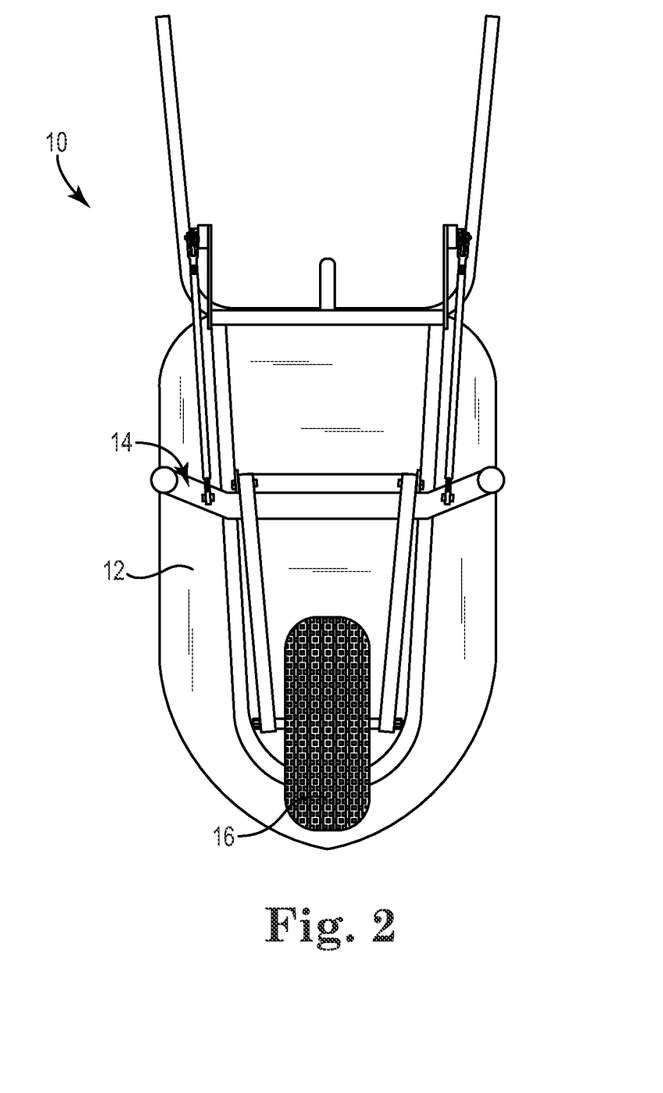
FIG. 2 is a bottom view illustrating a wheelbarrow in accordance with one embodiment.

FIGS. 1 and 2 illustrate respective perspective and bottom views of wheelbarrow 10 in accordance with one embodiment. In one embodiment, wheelbarrow 10 includes tub 12, frame 14 and wheel 16. In one embodiment, frame 14 is a two-part frame with a first part that includes handle 18 and a second part that supports tub 12. A user can grasp handle 18 in order to maneuver and control wheelbarrow 10. In one embodiment, handle 18 is releasable from the remainder of frame 14 such that a user can dump the contents of tub 12 by tipping tub 12 forward, but without having to significantly raise handle 18.

With a conventional wheelbarrow, the handles are fixed relative to the frame that supports the barrow. As such, in order to dump the contents from a conventional wheelbarrow, a user must raise his or her hands well above the waist area, sometimes as high as the shoulder area, in order to fully tip the barrow forward enough to fully dump its contents. Raising hands this high can be dangerous and cause a user to lose balance and/or to tip sideways. This can risk injury or damage.

Unlike prior solutions, wheelbarrow 10 can be controlled such that no such lifting of the hands is necessary in order to dump the contents from tub 12. In one embodiment, a trigger is provided on handle 18 adjacent to where a user's hands would be placed. As such, when a user actuates the trigger, handle 18 is released from the rest of frame 14 such that tub 12 can be tipped forward to begin dumping its contents, while the user's hands may be kept near waist level on handle 18. Because of the connection between handle 18 and the remainder of frame 14, the user will still have control over wheelbarrow 10, as will be more fully discussed below.

Figure 3A:
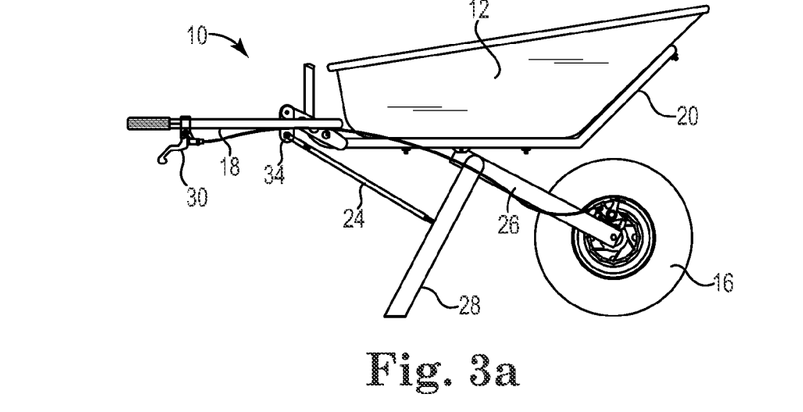
FIGS. 3a-c are side views illustrating a wheelbarrow in various stages of use in accordance with one embodiment.
Figure 3B:
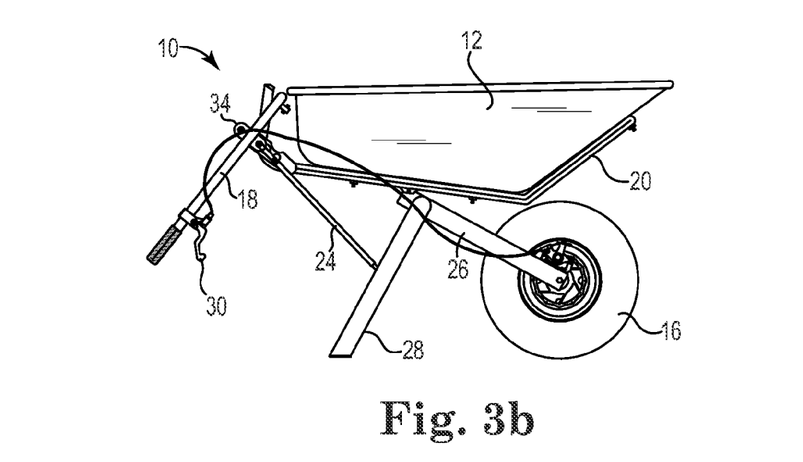
Figure 3C:
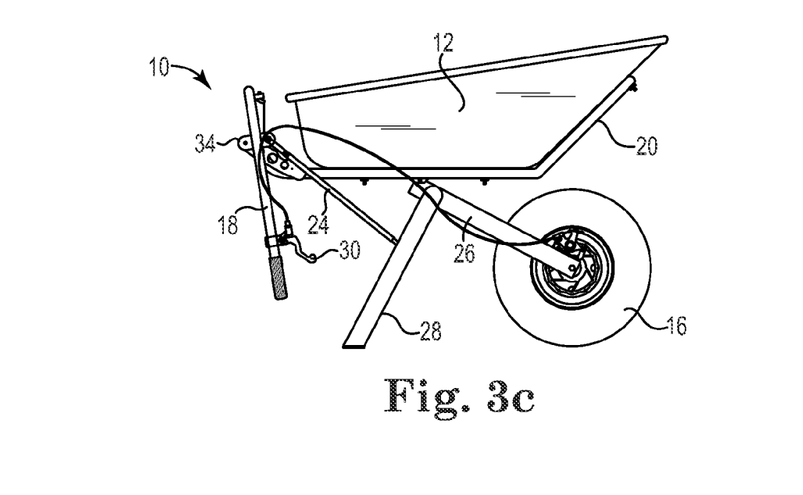

FIGS. 3a-3c illustrate wheelbarrow 10 in operation at various stages of use. In one embodiment, the overall dimensions of wheelbarrow 10 are close to those of a standard wheelbarrow. In one embodiment, frame 14 of wheelbarrow 10 includes handle 18, tub base 20, connecting rod 24, wheel fork 26 and support legs 28. In one embodiment, handle 18 is releasably connected to tub base 20. Tub 12 is fixed to tub base 20, and wheel fork 26 is coupled to tub base 20, which is further supported by support legs 28. Wheel fork 26 also carries wheel 16 at an end opposite the end that connects to tub base 20. Connecting rod 24 is coupled between handle 18 and support legs 28. Trigger 30 is provided on handle 18 and in one case controls the release of handle 18 from tub base 20.

FIG. 3a illustrates wheelbarrow 10 in a locked position. In this locked position, handle 18 is locked to tub base 20 and wheelbarrow 10 functions similarly to a conventional wheelbarrow. Handle 18 is lifted slightly by the user so that support legs 28 lift off the ground, and wheelbarrow 10 can then be pushed forward as the user applies a forward force on handle 18, wheelbarrow 10 thereby rolling forward with the turning of wheel 16.

FIGS. 3b and 3c illustrate wheelbarrow 10 in a released position. In operation of one embodiment, a user can release wheelbarrow 10 by pulling trigger 30, which releases handle 18, such that when it releases, handle 18 pivots on tub frame 20 as illustrated in FIGS. 3b and 3c. As illustrated, handle 18 can move from a substantially horizontal position, in the locked position of FIG. 3a, to a substantially vertical position, in the unlocked position of FIG. 3c, with FIG. 3b illustrating one intermediate unlocked position between the two. Connecting rod 24 is coupled between handle 18 and support legs 28 to further aid in the transition between the locked and unlocked position and to support handle 18.

In one embodiment, trigger 30 is configured to have two functions. In addition to releasing handle 18 from tub base 20, trigger 30 can also be configured to control a brake on wheel 16. As such, when trigger 30 is actuated a certain amount, it will engage the brake coupled to wheel 16 of wheelbarrow 10 and cause it to stop. When trigger 30 is actuated further, it will cause the release of the two-part frame 14 for dumping the contents of tub 12. Stated another way, a small force activates the brake, and a large force releases the two-part frame 14.

In another embodiment, the functionality of trigger 30 is broken out into two separate levers: one for triggering the brake and one for triggering the release of frame 14. In one case, the release of the two-part frame 14 can be accomplished at any time during operation without having to engage the brake. Also, the user can apply force to the brake without releasing the two-part frame 14. In one example, the two-lever system ensures safe operation and allows for a smaller gauge brake cable.

In one embodiment, trigger 30 is configured to be a finger-operated lever. In an alternative embodiment, trigger 30 is configured to be thumb operated, rather than finger. In one embodiment, the user's fingers are used to hold handle 18 and lift the load. With a finger operated lever, the user also uses one or more fingers to engage the lever, therefore requiring the user to lift the same load with fewer fingers. In one embodiment, a thumb lever is used, since in some cases a thumb can be less important than the fingers when using handle bars to lift a load.

In one embodiment, the brake on wheel 16 is a simple cable-actuated disc brake, such as found on a typical motorcycle or the like. In operation, once the brake is applied, the center of gravity of tub 12 is configured such that when handle 18 is released from tub frame 20, tub 12 will tip forward and handle 18 will tip down. As such, the user need only lift his or her hands slightly—near waist lever rather than near shoulder level—in order to dump the contents of tub 12.

With a cable-actuated disc brake system, pads and rotors essentially clean themselves whenever the brake is employed, thus reducing consumer maintenance time. In general, disc brakes have good stopping capability and are consistent with the wheelbarrow design, operating well in many types of terrain and weather conditions. The disc brakes can be mechanical or hydraulic. In general, mechanical brakes are less expensive than hydraulic brakes. In one embodiment, pre-stretched cable is used in conjunction with the brake system to increase the strength of the cable and prevent elongation during use.

Alternatives embodiments for a brake on wheelbarrow 10 include hydraulic, band, drum and any of a variety of other brakes. A band brake provides an effective system, because it uses both friction forces applied to the drum and tension forces in the band to produce stopping power. Thus a relatively small force applied to the brake by the operator equates to a large braking force. Because the brake is mounted directly to the shaft it can be easily removed for maintenance and replacement. Its use also eliminates extra brackets that can be used in mounting a disc brake system.

Figure 4A:
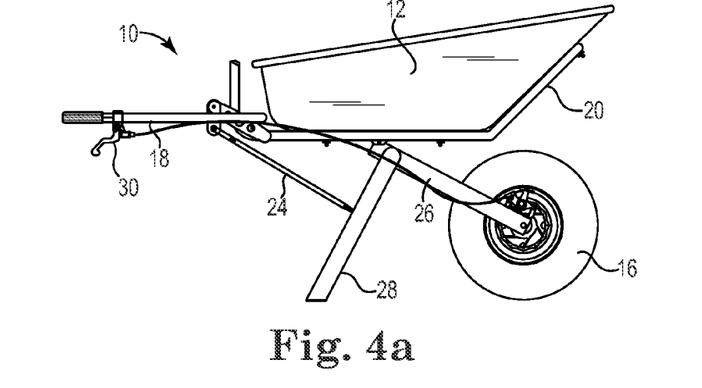
FIG. 4a-c are side views illustrating a wheelbarrow in various stages of use in accordance with one embodiment.
Figures 4B, 4C:
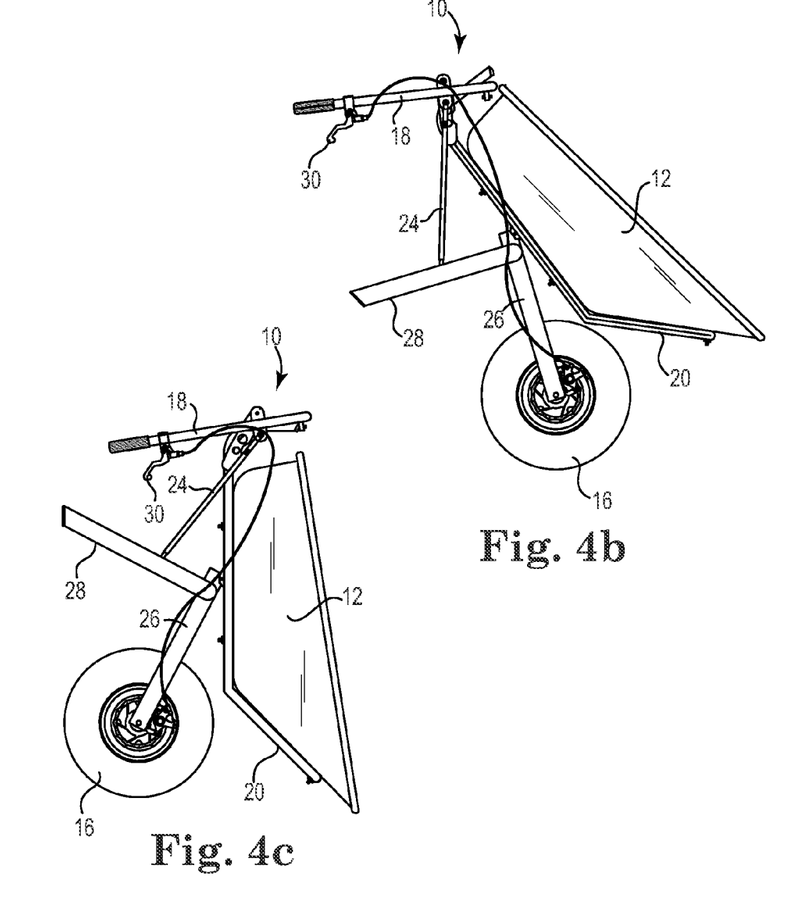

FIGS. 4a-4c illustrate wheelbarrow 10 in operation at various stages of dumping the contents of tub 12. In operation of one embodiment, triggering the brake on wheel 16 can aid in unloading tub 12. FIG. 4a illustrates wheelbarrow 10 in a locked position in which wheelbarrow 10 functions similarly to a conventional wheelbarrow. In one embodiment, a user can pull trigger 30 such that the brake stops wheel 16 from rolling.

Once the brake is applied and wheel 16 is stopped from rolling, then a user can pull trigger 30 further (or pull a separate trigger in another embodiment) to release handle 18 from tub frame 20. As illustrated in FIG. 4b, tub 12 will tip forward in this condition if the user continues to push forward slightly on handle 18 with wheel 16 braked. Also illustrated in the figure is that handle 18 is not raised significantly such that it is generally at waist height. As the user continues to push forward with wheel 16 braked and handle 18 released from tub frame 20, tub 12 continues to tip forward as illustrated in FIG. 4c. Again as illustrated in FIG. 4c, handle 18 is not raised significantly such that it is still generally at waist height. As such, the contents of tub 12 can be dumped without the user having to raise hands significantly above waist height.

Tub 12 can be any of a variety of sizes and made from any of a variety of materials in accordance with various embodiments. In one example, a six cubic foot wheelbarrow tub with a capacity of 500 pounds is used. In one embodiment, a painted steel tub is used and in another, a polymer-based tub is used. In one embodiment, a ribbed polymer tub that is self-reinforced is used to allow a stronger structural design.

Figure 5:
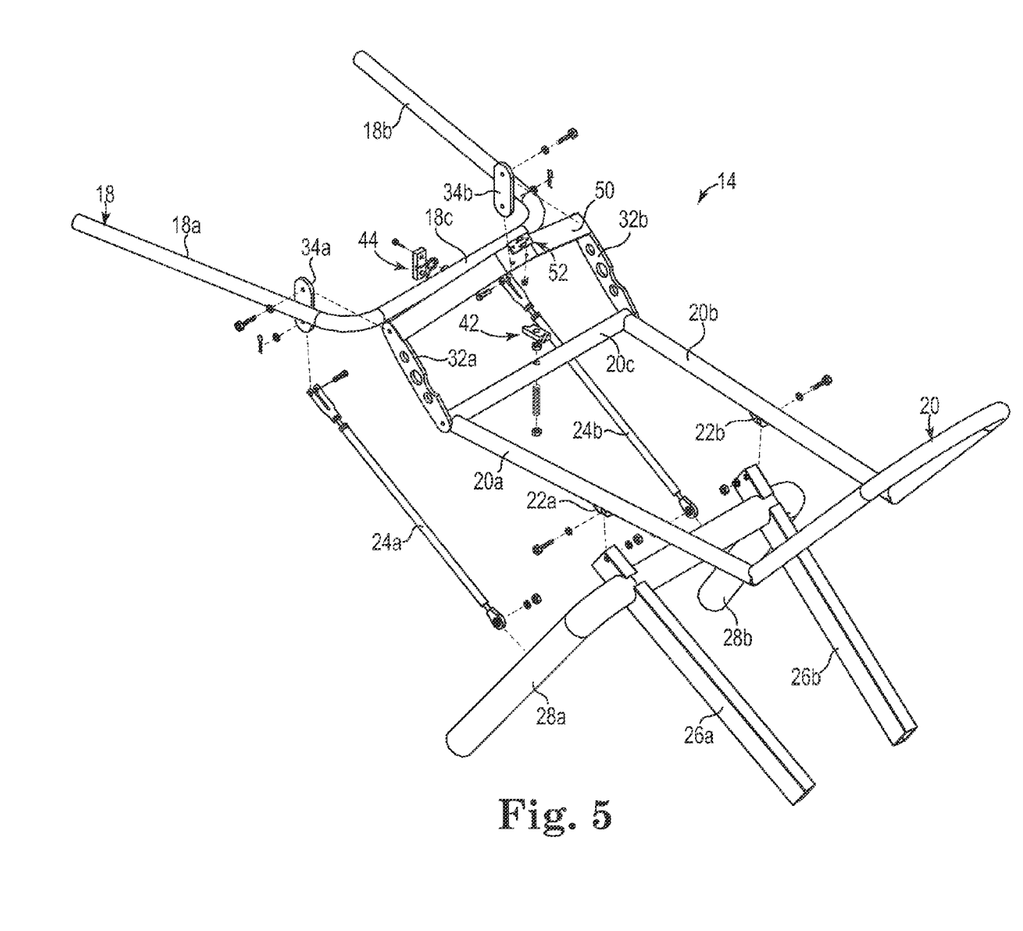
FIG. 5 is an exploded view illustrating a wheelbarrow frame in accordance with one embodiment.

FIG. 5 illustrates frame 14 of wheelbarrow 10 in accordance with one embodiment, with tub 12 and wheel 16 removed to illustrate further detail. In one embodiment, frame 14 includes handle 18, first, second and third handle sections 18a, 18b and 18c, tub base 20, first, second and third base sections 20a, 20b, and 20c, first and second base connection points 22a and 22b, first and second connecting rods 24a and 24b, first and second wheel fork sections 26a and 26b, first and second support legs 28a and 28b, first and second couplers 32a and 32b and first and second pivots 34a and 34b.

Although FIG. 5 illustrates frame 14 in an exploded view, it is readily seen that first and second couplers 32a and 32b are coupled respectively to first and second sections 20a and 20b of tub base 20 (on either side of third section 20c), and in one embodiment, extend slightly upward. As also illustrated in FIG. 5, first and second pivots 34a and 34b are correspondingly secured to first and second sections 18a and 18b of handle 18. Handle 18 is then secured to tub base 20 in one embodiment, by securing bolts, pins or the like through first pivot 34a and first coupler 32a, and through second pivot 34b and second coupler 32b. In one embodiment, these bolts are attached about handle 18. In this way, handle 18 pivots relative to tub base 20 on this connection between first and second couplers 32a and 32b and first and second pivots 34a and 34b.

In order to further secure handle 18 relative to other parts of frame 14, first and second connecting rods 24a and 24b are coupled between handle 18 and first and second support legs 28a and 28b. In one embodiment, one end of each of first and second connecting rods 24a and 24b is respectively coupled to a lower side of first and second pivots 34a and 34b while the other end of each of first and second connecting rods 24a and 24b is respectively coupled to first and second support legs 28a and 28b. In this way, one handle 18 is in the released position discussed above, and begins to pivot down toward first and second support legs 28a and 28b, first and second connecting rods 24a and 24b provide physical support to handle 18 so that a user maintains support and control over wheelbarrow 10 even while handle 18 is released. In one embodiment, the height of handle 18 is adjustable through use of adjustable length first and second connecting rods 24a and 24b. In one case, a male to female connection of Heim joints can be used.

In operation, first and second pivots 34a and 34b rotate as handle 18 is released from its locked position and pivots down toward first and second support legs 28a and 28b. As illustrated in the sequence of FIG. 3a-3c, pivot 34 is illustrated starting in a substantially vertical orientation and moving to a substantially horizontal orientation. When handle 18 is maintained in a substantially horizontal orientation, such as when being held by a user, the sequence of FIG. 4a-4c illustrate that the contents of tub 12 are readily dumped.

In one embodiment, first and second wheel fork sections 26a and 26b couple to tub base 20 at first and second base connection points 22a and 22b, respectively. In one embodiment, first and second base connection points 22a and 22b are located approximately at the midpoint of first and second sections 20a and 20b of tub base 20, relative to the front and back of tub base 20 (the back being where handle 18 connects and the front being where tub 12 tips to empty its contents). Once tub 12 is secured to tub base 20, such as illustrated in FIG. 1, tub 12 will have a center of gravity relative to the front and back of tub base 20. In one embodiment, the center of gravity of tub 12 is forward of first and second base connection points 22a and 22b. Stated another way, first and second base connection points 22a and 22b are located between handle 18 and the center of gravity of tub 12.

As such, when wheelbarrow 10 is in its released position and handle 18 is pivoting down relative to tub base 20 (and tub 12 coupled thereto), the center of gravity of tub 12 being forward first and second base connection points 22a and 22b tends to tip tub 12 forward pivoting on first and second wheel fork sections 26a and 26b, which tend to act as a fulcrum in one embodiment. This allows the contents of tub 12 to be readily tipped out when wheelbarrow 10 is in its released position. In one embodiment, the weight of a load within tub 10 further assists in the dumping process.

Where tub 12 is symmetrical front to back, its center of gravity is approximately in its center measured from front to back, and first and second base connection points 22a and 22b are located closer to the back of the tub base 20 (where handle 18 connects) than to the front. This way, the weight of tub 12 tends to tip out its contents when wheelbarrow 10 is in its released position. Where tub 12 is not symmetrical, for example, where it has more weight in its front, first and second base connection points 22a and 22b can be located closer to the front of tub base 20, while still allowing for the weight of tub 12 to tip out its contents when wheelbarrow 10 is in its released position.

In one embodiment, wheel 16 connect between first and second wheel fork sections 26a and 26b as illustrated in FIGS. 1-4c. Wheel 16 can be connected in any of a variety of conventional ways in accordance with various embodiments. In the illustrations, wheel 16 is illustrated between two wheel fork sections 26a and 26b, but in other embodiments a single-sided wheel fork may be used. In such case of a single-sided wheel fork, a cross-brace may be connected between first and second base connection points 22a and 22b from which the single wheel fork may extend.

Figure 6:
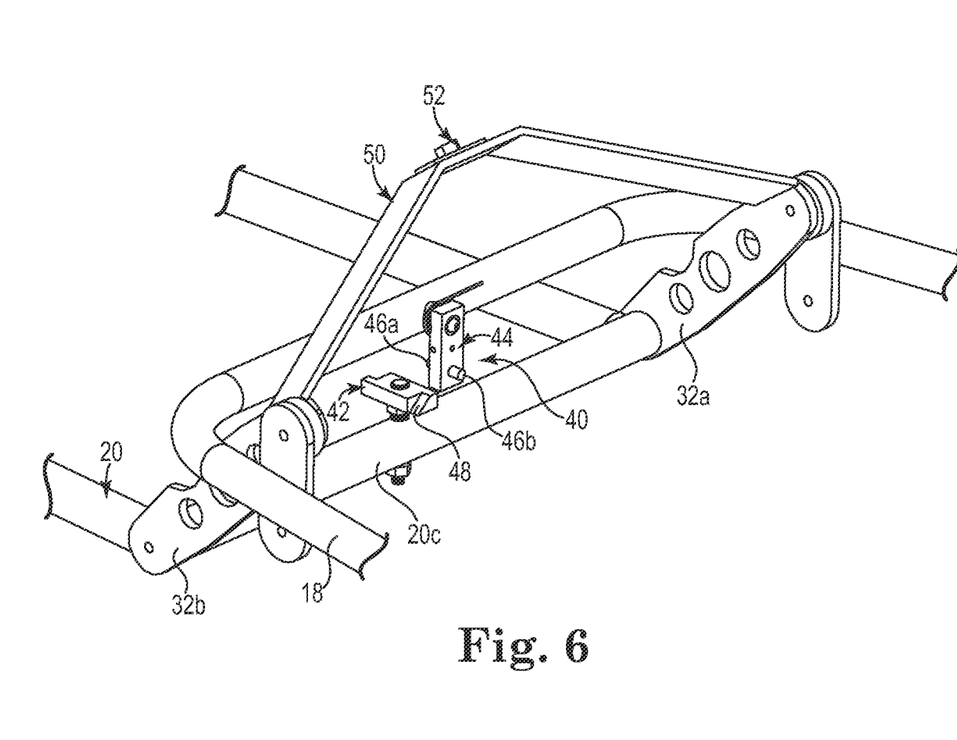
FIG. 6 is partial view illustrating a locking mechanism on a wheelbarrow frame in accordance with one embodiment.

FIG. 6 illustrates lock 40 for frame 14 in accordance with one embodiment. In one embodiment, lock 40 selectively locks handle 18 to tub base 20 in the locked position of wheelbarrow 10 and then releases to unlock handle 18 from tub base 20 in the released position of wheelbarrow 10. In one embodiment, trigger 30 is coupled to lock 40, such that pulling trigger 30 releases lock 40 to unlock handle 18 from tub base 20. Again, trigger 30 can also control the brake on wheel 16, or the braking and releasing functions can be separated into two separate triggers—one on each side of handle 18 adjacent where the user's hands would grasp.

In one embodiment, lock 40 includes catch 42 and latch 44. Catch 42 is illustrated secured to tub base 20, on third base section 20c, and latch 44 is secured to handle 18, on third handle section 18c. In one embodiment, latch 44 is a spring-loaded cam pin and includes first and second pins 46a and 46b extending therefrom. Also, catch 42 is configured with ramp 48. When latch 44 is pushed down toward catch 42, such as when handle 18 is moving toward tub base 20 when switching from a released position to a locked position, first pin 46a is configured to slide down ramp 48 until pin 46a moves fully below catch 42. Once there, latch 44 is locked against catch 42, thereby locking handle 18 to tub base 20.

In one embodiment, a cable is coupled between trigger 30 and latch 44, such that pulling on trigger 30 pulls the cable rotating latch 44 on its connection point to handle 18, thereby unlocking latch 44, and pin 46a, from catch 42. This unlocks handle 18 from tub base 20 changing wheelbarrow 10 from its locked to its released position. The cable coupling trigger 20 and latch 44 can also couple trigger 30 with the brake on wheel 16, or a separate cable can couple trigger 30 and the brake. In either event, the lengths of the cables can be readily adjusted so that pulling trigger 30 a certain distance applies the brake and pulling a certain additional distance disengages latch 44. Where two triggers are used, puling one and its associated cable can apply the brake, while pulling the other and its associated cable can disengage latch 44.

In one embodiment, connection bar 50 is added between first and second coupler 32a and 32b. An additional catch 52 can be attached to connection bar 50 at a location where second pin 46b can engage catch 52, similar to the arrangement described above with respect to first pin 46a and catch 42. In this way, wheelbarrow 10 can have a second locked position when handle 18 is fully rotated down, such as illustrated in FIG. 3c. In one embodiment, the second locked position (illustrated in FIGS. 3c and 4c) would still allow further dumping motion, but would restrict handle 18 from returning to the original position (illustrated in FIGS. 3a and 4a). To return tub 12 to its original position, the user pulls trigger 30 again to releases latch 44 from catch 52.

Locking handle 18 in this second locked position may be useful in storage of wheelbarrow 10 or for maneuvering wheelbarrow 10 when tub 12 has been emptied. Having handle 18 lock in the dumping position will allow the user to pull wheelbarrow 10 backwards to simplify load spreading.

Wheelbarrow 10 can have a variety of designs of frame 14 in accordance with various embodiments. For example, the figures illustrate first and second support legs 28a and 28b as flared legs. In one embodiment where the leg design flares outward at the bottom of the legs 28a and 28b, this will make wheelbarrow 10 more stable while being loaded. Also, this flared design will provide operator safety when dumping a load from tub 12. In other embodiments, different orientations may be used, such as legs that extend straight down substantially parallel to each other, or even a single broader leg.

In various embodiments, different sizes and shapes are used for the parts of frame 14. Weight, strength, cost, and ease of manufacturing can all factor in to the tubing size and shape chosen. In one embodiment, the wheelbarrow will have to carry a load of 500 pounds, and the overall weight is close to that of a standard wheelbarrow. In one embodiment, the size of tub base 20, wheel fork 26 and support legs 28 will range from 1" to 2", and can be square, round, oval or other shapes in cross section. The shape of the tubing used for frame 14 can affect the way that frame 14 is assembled. Factors of tubing shape may be low cost, strength, and ease of manufacturing. Factors include strength, since safety and product life may also be considered in some embodiments.

In one embodiment, wheelbarrow 10 can further include a push-assist feature. The push assist feature helps a user of wheelbarrow 10 maneuver up small inclines with large loads.

In one embodiment, this feature is not meant to stand alone as the principal supply of forward motion, but rather supply a small amount of help.

One push assist alternative includes a friction drive system. In one case, the friction drive system uses a gas powered motor to spin a friction wheel/shaft that is in direct contact with the wheel of the wheelbarrow. One application uses either two or four cycle motors under 50 cc that had a nominal output of 1.1 to 2.2 horsepower. One push assist alternative includes a roller drive system. A roller drive looks like a normal shaft but has an internal motor that rotates the outer cylinder.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A wheelbarrow comprising:
   a tub;
   a first frame portion coupled to, and providing support for, the tub;
   a wheel supported below the first frame portion;
   a second frame portion releasably coupled to the first frame portion and configured with a handle for gripping by a user;
   a first trigger adjacent the handle configured to release the first frame portion from the second frame portion when the trigger is actuated such that the tub is readily dumped;
   a wheel fork coupled between the wheel and the first frame portion, wherein the tub has a center of gravity and the wheel fork is coupled to the first frame portion between the handle and the center of gravity of the tub; and
   connecting rods coupled between the handle and the wheel fork, thereby providing support between the handle and the wheel fork when the wheelbarrow is in the released position.

2. The wheelbarrow of claim 1, further comprising a lock mounted between the first and second frame portions locking them together, and configured such that when the first trigger is actuated the lock releases thereby releasing the first and second frame portions.

3. The wheelbarrow of claim 1, further comprising a brake coupled to the wheel and a second trigger coupled to the brake, wherein actuating the second trigger engages the brake and prevents the wheel from rotating, thereby holding the wheelbarrow in place.

4. The wheelbarrow of claim 3, wherein the tub of the wheelbarrow tips forward dumping its contents when a user applies a forward force to the handle while the brake is engaged and while the first and second frame portions are released from each other.

5. The wheelbarrow of claim 3, wherein the first and second triggers are the same device, wherein actuating the device a first amount releases the first and second frame portions and actuating the device a second amount engages the brake.

6. The wheelbarrow of claim 3, wherein the first and second triggers are separate devices and are located on opposite sides of the handle such each are readily proximate to opposing hands of a user.

7. A wheelbarrow comprising:
   a tub supported on a tub base and configured to carry a load;
   a handle configured to be gripped in the hands of a user, the handle pivotally connected to the tub base;
   a wheel fork coupled to the tub base on one end and to a wheel on another, the wheelbarrow configured to roll on the wheel;
   support legs coupled under the tub base and configured to support the wheelbarrow; and
   a lock coupled between the handle and the tub base and configured to lock the handle and the tub base together in a locked position and configured to allow the handle and the tub base to rotate relative to each other in a released position; and
   connecting rods coupled between the handle and the support legs, thereby providing support between the handle and the support legs when the wheelbarrow is in the released position;
   wherein releasing the lock changes the wheelbarrow from the locked position to the released position thereby causing the tub to tip forward when the user pushes forward on the handle.

8. The wheelbarrow of claim 7, wherein the wheel fork is coupled to the tub base in a location such that, when the wheelbarrow is changed from the locked position to the released position, the weight of the tub will tend to tip the tub forward.

9. The wheelbarrow of claim 7, wherein the tub has a center of gravity, wherein the tub base has a front end and a back end, wherein the handle is coupled to the back end of the tub base, and wherein the wheel fork is coupled to the tub base between the back end and the center of gravity of the tub such that when the wheelbarrow is in the released position the weight of the tub will tend to tip the tub forward.

10. The wheelbarrow of claim 7, wherein the lock comprises a catch coupled to the tub base and a latch coupled to the handle, wherein the wheelbarrow is in the locked position when the latch is engaged with the catch and wheelbarrow is in the released position when the latch is released from the catch.

11. The wheelbarrow of claim 10, wherein the lock comprises a second catch configured to engage the latch when the handle rotates substantially in the released position such that the wheelbarrow has a second locked position wherein the wheelbarrow can be moved with the tub tipped forward.

12. The wheelbarrow of claim 7, further comprising at least one pivot coupled adjacent the handle, wherein the tub base couples to the pivot above the handle and wherein at least one of the connecting rods couples to the pivot below the handle.

13. The wheelbarrow of claim 7, further comprising a trigger on the handle and coupled to the lock, wherein actuating the trigger changes the wheelbarrow from the locked position to the released position.

14. The wheelbarrow of claim 13, further comprising a brake coupled to the wheel and a second trigger coupled to the brake, wherein actuating the second trigger engages the brake and prevents the wheel from rotating, thereby holding the wheelbarrow in place.

15. A method of using a wheelbarrow comprising:
   carrying a load in a tub that is supported on a tub base;
   gripping a handle of the wheelbarrow, the handle pivotally connected to the tub base;
   moving the wheelbarrow while in a locked position by applying a force to the handle such that the wheelbarrow rolls on a wheel coupled the a wheel fork, the wheel fork coupled to the tub base;
   unlocking the wheelbarrow into a released position such that the handle and the tub base to rotate relative to each other and applying a forward force on the handle such that the tub tips forward dumping the load; and controlling the tub while the wheelbarrow is unlocked by connecting rods that are coupled between the handle and the wheel fork.

16. The method of claim 15, further comprising pulling a trigger to engage a brake coupled to the wheel to prevent the wheel from rotating, thereby holding the wheelbarrow in place.

* * * * *